United States Patent [19]
Stein et al.

[11] Patent Number: 6,039,228
[45] Date of Patent: Mar. 21, 2000

[54] CARRIER FOR A TRAILER-HITCH RECEIVER WITH IMPROVED PIN LOCK

[76] Inventors: John P. Stein, 14087 State Hwy. 15; J. Dean Hendrickson, 34050 732 Ave., both of Kimball, Minn. 55353

[21] Appl. No.: 09/183,713

[22] Filed: Oct. 30, 1998

[51] Int. Cl.⁷ .................. B60R 9/08; B60R 9/06
[52] U.S. Cl. .......... 224/532; 224/521; 224/533; 224/924; 403/254; 211/193; 211/206
[58] Field of Search ................ 224/488, 518, 224/519, 520, 521, 522, 523, 531, 532, 533, 545, 564, 565, 924; 403/252, 253, 254, 255, 233, 261, 263; 211/193, 204, 206

[56] References Cited

U.S. PATENT DOCUMENTS

| | | |
|---|---|---|
| D. 308,846 | 6/1990 | Eckhart . |
| 1,666,507 | 4/1928 | Puffe . |
| 2,719,750 | 10/1955 | Orr ........................................ 403/252 X |
| 3,437,248 | 4/1969 | Allen . |
| 3,765,581 | 10/1973 | Kosecoff . |
| 3,794,227 | 2/1974 | Stearns . |
| 3,800,967 | 4/1974 | Kosecoff ............................. 224/532 X |
| 4,116,341 | 9/1978 | Hebda . |
| 4,225,068 | 9/1980 | Ingram ................................ 403/252 X |
| 4,397,432 | 8/1983 | Resetar ................................ 211/193 X |
| 4,406,384 | 9/1983 | Schantz . |
| 4,676,413 | 6/1987 | Began et al. . |
| 4,676,414 | 6/1987 | Deguevara . |
| 5,004,133 | 4/1991 | Wyers ................................. 224/532 X |
| 5,096,102 | 3/1992 | Tolson ................................. 224/523 X |
| 5,161,268 | 11/1992 | Harrow ................................ 403/254 X |
| 5,330,312 | 7/1994 | Allsop et al. . |
| 5,406,304 | 4/1995 | Porter et al. . |
| 5,469,997 | 11/1995 | Carlson . |
| 5,476,202 | 12/1995 | Lipp . |
| 5,788,192 | 8/1998 | Poole, Jr. ............................ 211/193 X |

FOREIGN PATENT DOCUMENTS

| | | | |
|---|---|---|---|
| 2062999 A1 | 9/1992 | Canada ................................. 224/532 |
| 41 889 | 12/1981 | European Pat. Off. . |
| 2327994 | 1/1975 | Germany ............................. 403/253 |
| 142227 | 6/1980 | Germany ............................. 403/254 |

*Primary Examiner*—Gregory M. Vidovich
*Attorney, Agent, or Firm*—Albert W. Watkins

[57] ABSTRACT

A vehicle receiver mounted cargo carrier is readily configured to transport bicycles, skis and poles, snowboards, canoe paddles and other cargo through the use of a vertical frame into which various rods may be placed, at locations most suited for the specific cargo. The rods are anchored through the use of a slide having keyhole shaped openings which mate into a circular reduction in the ends of the rods. Other structural components form anchor points for the cargo that also help to retain the cargo and act as theft deterrents. The carrier is designed to be free standing out of the vehicle receiver, and so may be used as a storage organizer for the cargo before, during and after transport. Prior to assembly, the components of the carrier are relatively two dimensional, so the carrier may be packaged, stocked and sold in compact, flat packaging. Alternative support struts offer additional methods of supporting the cargo.

20 Claims, 5 Drawing Sheets

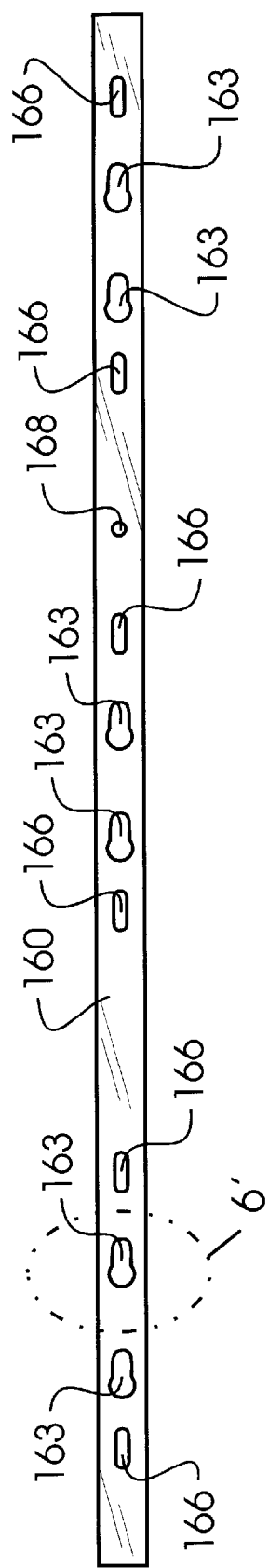
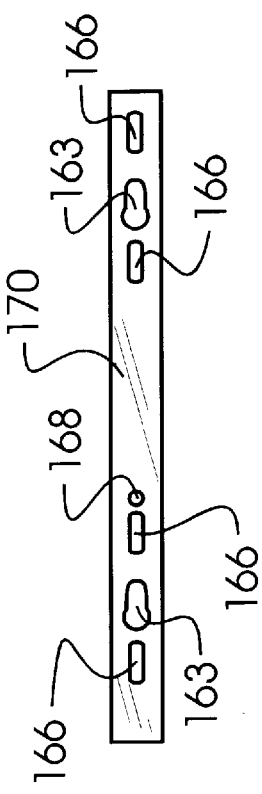
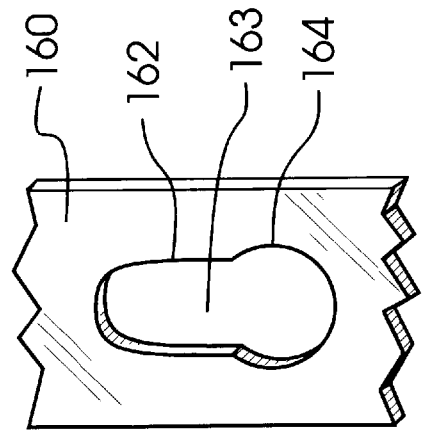
FIG. 5
FIG. 7
FIG. 6

CARRIER FOR A TRAILER-HITCH RECEIVER WITH IMPROVED PIN LOCK

BACKGROUND OF THE INVENTION

1. Field of the Invention

This invention pertains to article carriers generally, and particularly to multi-purpose ski and bicycle carriers that engage a trailer type receiver hitch.

2. Description of the Related Art

Passenger vehicles are well adapted to transport people, as they were designed to do, and will readily transport small cargo such as grocery sacks and briefcases. People, however, do not always choose to rely upon passenger vehicles for transportation. During outings, such as week-end trips, vacations or competitions, other modes of transportation are often desired. Skis, snowboards or bicycles may be integral to the outing. The recreational enthusiast knows the value of quiet leisure away from the hustle and bustle of the city, but must somehow find a way to carry both passengers and additional transportation equipment to the place of leisure. The competitor must get to and from the competitions, and will want to preserve the equipment for competition.

The method of transporting equipment should not detract from the goal of the outing, be it leisure or competition, nor should it cause any damage to the passenger vehicle. Unfortunately, in the past these simple goals have each been contrary to each other. A multitude of roof-top racks and carriers have been designed for either permanent or temporary mounting. These carriers are usually designed and manufactured to be compatible with one or a limited number of vehicles, since each vehicle is sized and shaped uniquely.

While the permanent variety usually are more reliable in load carrying, they are also usually installed at the factory to carefully control installation and thereby prevent any leakage or damage which might otherwise occur. Moreover, they permanently add to the size of the vehicle, and also generally detract from the vehicle's appearance.

Temporary carriers have been designed from diverse materials and geometries, including materials such as foam block, foam pad, rubber, plastic, metal and wood. To reduce the inventory required by a vendor to sell the temporary carrier, common vehicle features are used to attempt to provide the necessary support for cargo. For example, gutters are often found around vehicle doors, and a number of carriers clamp onto these gutters. Unfortunately, not all vehicles have features such as gutters, and so several different carriers must still be designed. Other carriers rely on the roof of the vehicle to provide both load bearing and also a place for friction, suction or magnetic grab. These temporary carriers have a tendency to be more temporary than planned or desired, occasionally allowing the cargo to slip and either be damaged or damage the vehicle. Such an event is totally unacceptable and will render a carrier useless.

In addition to the other challenges, roof-top carriers present an obstacle during loading and unloading. The equipment must somehow be placed on top of the vehicle without damaging either the vehicle or the equipment. Yet, the reason the equipment is being placed on top of the vehicle is because of large size and/or great bulk.

Other prior art carriers have been designed to mount on the bumper of a vehicle. While this type of carrier is often easier to load and unload, the limitations related to different vehicle designs found with the roof top carriers are still present. Different vehicles have different bumper designs. Some of the most modern vehicles offer no access to the bumper at all, and so different carriers must still be designed and stocked to accommodate different vehicles.

Given the limitations of the prior art, it is not surprising that there has been a relative explosion in carriers designed to install directly into a hitch receiver. The hitch receiver acts as a universal coupling into which utility and boat trailers may be attached, and may also be used to support a carrier. Like the bumper carrier, a hitch receiver carrier provides the advantage of easy equipment loading. In addition, hitch receivers have become standard to two sizes. The large size, a two inch receiver, is designed for high loads and may be specified, for example, for trailers as large as 3,500 pounds and tongue weights as great as 350 pounds. For smaller loads, typically up to 2,000 pounds and tongue weights of 200 pounds, a one and one-quarter inch hitch receiver is used.

While the hitch receiver designs have vastly eased the problems of different vehicle designs, there are still limitations therein that manufacturers have not been able to satisfactorily address. One limitation is the variability of equipment a user will transport. Some manufacturers have addressed each different type of equipment with different add-on components which adapt the carrier to the particular equipment. Unfortunately, a store then has to stock each of the different components. The user will also have to store all of the unused components, and remember the intended purpose of each of the components. Obviously, making the carrier adaptable to a variety of cargo is an expensive proposition for all involved, and is therefore undesirable when such add-ons are required.

Another problem with hitch receiver carriers is when they support relatively large loads. The carrier is on a long arm extending from the receiver. When acceleration occurs in a vertical direction, the receiver is carrying the load exactly as it was designed for. Unfortunately, events such as acceleration, bumps and cornering lead to forces which are not always directly vertical. Particularly with the long vertical arm, forces transverse to the vehicle are amplified at the hitch. The carrier may sway or pivot undesirably within the receiver. Furthermore, even with purely vertical forces, the carrier may rattle or chatter within the receiver. Finally, there are two different standard receiver sizes that must be accommodated.

Some prior art carriers are illustrated in U.S. Pat. No. 3,437,248 to Allen, U.S. Pat. No. 4,406,384 to Schantz, U.S. Pat. No. 4,676,414 to Deguevara, Des. U.S. Pat. No. 308,846 to Eckhart, U.S. Pat. No. 5,469,997 to Carlson, and U.S. Pat. No. 5,476,202 to Lipp, the contents and teachings of each incorporated herein by reference. The Allen patent was one of the early patents which showed a multi-purpose carrier that included bicycle, ski and roof-top capability. Like many of the other subsequent patents, however, the Allen design is limited to one or two bicycles, provided the bicycles are of the right design, or, alternatively, two pairs of skis. Bicycles of unusual design, or other objects aside from the skis, are not as easily accommodated, nor are multiples of bicycles and skis.

Schantz discloses a bumper mounted carrier that includes a cargo area behind the vehicle and also on the roof-top. The Schantz design does not include adaptations for any particular type of load, but does illustrate a dual platform carrier.

Deguevara illustrates a receiver mounted bicycle carrier, with a separate attachment for carrying skis. The Deguevara patent illustrates some of the fundamental limitations discussed previously. The carrier is limited to a predetermined number and type of bicycles, two as illustrated, and requires additional hardware, purchased separately, to accommodate skis. Other equipment would require yet more hardware.

Eckhart discloses an elegantly simple bicycle carrier using rods that are inserted using cotter pins. Unfortunately, no provisions are made for other types of cargo aside from bicycles. Carlson discloses a different, yet also well devised, bicycle carrier. Unfortunately, like the Eckhart design, no provisions are made for other cargo.

Lipp discloses a bicycle and ski carrier which is capable of transporting several pairs of skis or bicycles without requiring separate add-on components, but the Lipp design is limited to carrying one type of cargo at a time, wherein the cargo must be consistent. In other words, either skis all having the same approximate thickness or bicycles having frame pieces of approximately the same diameter and having appropriate shape and dimension will fit onto the carrier, but not both simultaneously.

The prior art limitations on adaptability are particularly apparent when a larger number of bicycles are desirably transported, particularly when those bicycles may include racing bicycles, bicycles without a top bar between seat and handle bars, and bicycles which may not have openings within the frame structure at all. Other difficult combinations are various assortments such as skis and bicycles or other combinations of diverse equipment.

In copending patent application Ser. No. 08/916,850 filed Aug. 22, 1997, the entire contents incorporated herein by reference, a carrier is disclosed which has removable load-supporting pins. The pins are easily reconfigurable, which allows the carrier to be adapted to a variety of different loads. In the co-pending application, the pins are retained by cotter pins, which increases the numbers of parts undesirably, and increases the chance of lost components either before or after delivery to the end user. In addition, the numbers of reconfigurable components, while advantageous for some applications, is also less desirable from a manufactured parts count.

SUMMARY OF THE INVENTION

In a first manifestation the present invention comprises a cargo carrier having a support having a transverse hole; a rod extending through the hole and extending transverse to the support for directly engaging cargo and having a first end enlarged relative to and adjacent a narrower region and a second section enlarged and adjacent the narrower region but located longitudinally opposite the first end relative to the narrower region; a sliding keyhole lock having a keyhole opening therein and having a first larger diameter opening through which the first end of the rod will pass and a smaller slot opening extending from the first larger diameter opening through which the first end of the rod will not pass but through which the adjacent narrower region will pass; the rod engaged by the sliding keyhole lock at the narrower region, whereby the rod is retained in the hole by the sliding keyhole lock.

In a second manifestation of the invention, an adaptable vehicularly mounted carrier for skis, ski poles, bicycles, snowboards, surf boards, canoe paddles and other cargo comprises means for releasable locking to a vehicle; means for supporting a load coupled to the locking means and extending primarily vertically therefrom and releasably retained by the locking means to the vehicle, a plurality of means for engaging with the cargo and supported on the load supporting means; a means for restraining the plurality of engaging means to the load supporting means having a first opening through which the engaging means may pass, a second opening smaller than but adjacent to the first opening through which the engaging means may not pass, the restraining means adjustable to align either of the first or second opening with engaging means; the plurality of engaging means releasably attachable to the supporting means at a plurality of both horizontally and vertically different locations and extending primarily horizontally to securely engage the various cargo.

In a third manifestation, the invention is a trailer hitch carrier which can be attached to a motor vehicle trailer hitch receiver and supported thereon, comprising: a carrier hitch insertable within the motor vehicle trailer hitch receiver; a first vertical strut extending vertically from the carrier hitch; a first horizontal strut adjacent at a midpoint thereof to the first vertical strut but perpendicular thereto and transverse to the carrier hitch, the first horizontal strut having a plurality of holes and also a first end and second end opposite each other from the midpoint; a second vertical strut adjacent the first end of the horizontal strut but perpendicular thereto, the second vertical strut having a plurality of holes therethrough; a third vertical strut adjacent the second end of the first horizontal strut but perpendicular thereto, the third vertical strut having a plurality of holes therethrough; a plurality of rods extending from some of the plurality of holes in the second and third vertical struts for engaging with cargo and repeatably removable therefrom; a first locking means adjacent to, retained with and movable relative to the second vertical strut for locking some of the rods to the second vertical strut; and a second locking means adjacent to, retained with and movable relative to the third vertical strut for locking some of the plurality of rods to the third vertical strut.

OBJECTS OF THE INVENTION

A first object of the present invention is to provide an adaptable carrier which can accommodate very diverse articles simultaneously, including bicycles of all types, skis and poles, and many other articles, without requiring separate apparatus for each type of article. A second object of the invention is to be able to load and unload diverse articles without risk of damage to vehicle or articles. Another object is to be able to use the carrier as a storage organizer when not in use within a receiver hitch, thereby reducing storage space required for both the articles and the carrier. A further object is to provide either self-supporting or hanging storage. Yet another object of the present invention is to use components which are readily re-usable, and which simultaneously allow the carrier to be shipped in relatively flat and compact packaging cartons prior to resale. The invention is also desirably reconfigurable without the need for a large number of small, easily misplaced parts. The invention is also desirably assembled from easily manufactured and relatively low-cost components. Another object of the invention is to keep the carrier as strong as possible while still keeping the weight to a minimum. A further object of the invention is readily adapt the carrier for different sized receivers, without requiring separate carriers to be stocked. The invention will also desirably include the option of a cargo box, which can also separately store items when not in use. Another object is to allow expansion of the carrier with additional special purpose components for specific items. A further object is to allow components to be locked into place onto the carrier to reduce the likelihood of theft. These and other advantages are achieved in the preferred embodiment of the invention, which is described hereinbelow in conjunction with the drawing figures. To keep the drawings as legible as possible, while still clearly identifying unique features, identical features have not been renumbered in the figures subsequent to FIG. 1, except for reference and bearing purpose, and will be understood to be the same as those of FIG. 1.

BRIEF DESCRIPTION OF THE DRAWINGS

FIG. 5 illustrates the sliding lock from a top plan view, while FIG. 6 illustrates an enlarged partial view of one keyhole taken along section line 6' of FIG. 5.

FIG. 7 illustrates the top sliding lock from top plan view.

DESCRIPTION OF THE PREFERRED EMBODIMENT

Figure 1:
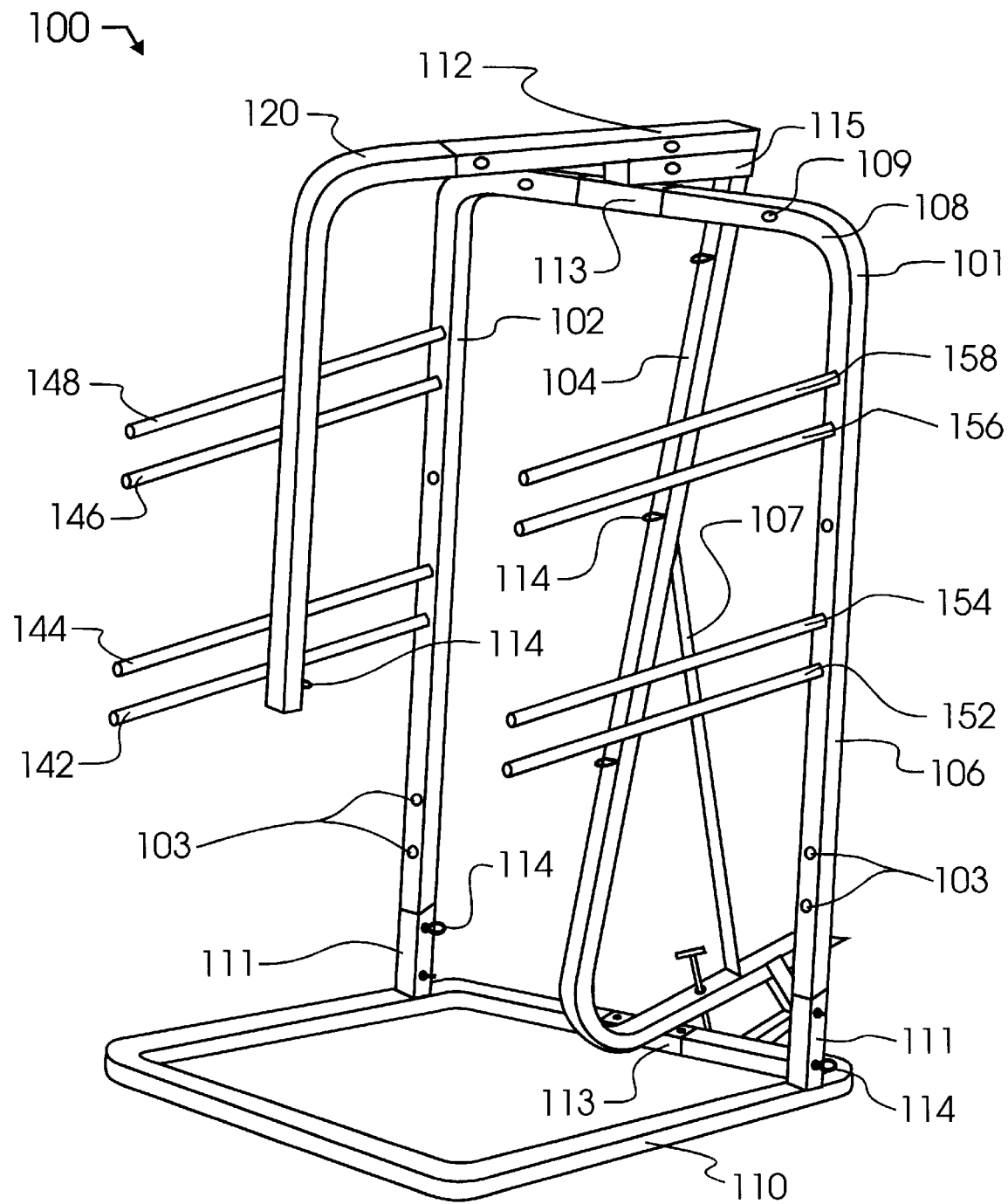
FIG. 1 illustrates the preferred embodiment of the invention, configured to carry snowboards, skis or other similar objects, from a projected view.

Carrier 100 is comprised by a U-shaped tube 101 having two major vertical struts 102 and 106. Vertical struts 102 and 106 have a number of holes 103 therethrough, extending longitudinally parallel with hitch 105. Seven holes 103 are illustrated on each of struts 102 and 106, but the exact number, placement and orientation of holes 103 is not critical to the invention. Preferably, an assortment of holes 103 will be provided sufficient to enable carrier 100 to adequately support a large number of articles including, but not limited to, bicycles, skis, snowboards, and other recreational and utilitarian devices.

Figure 2:
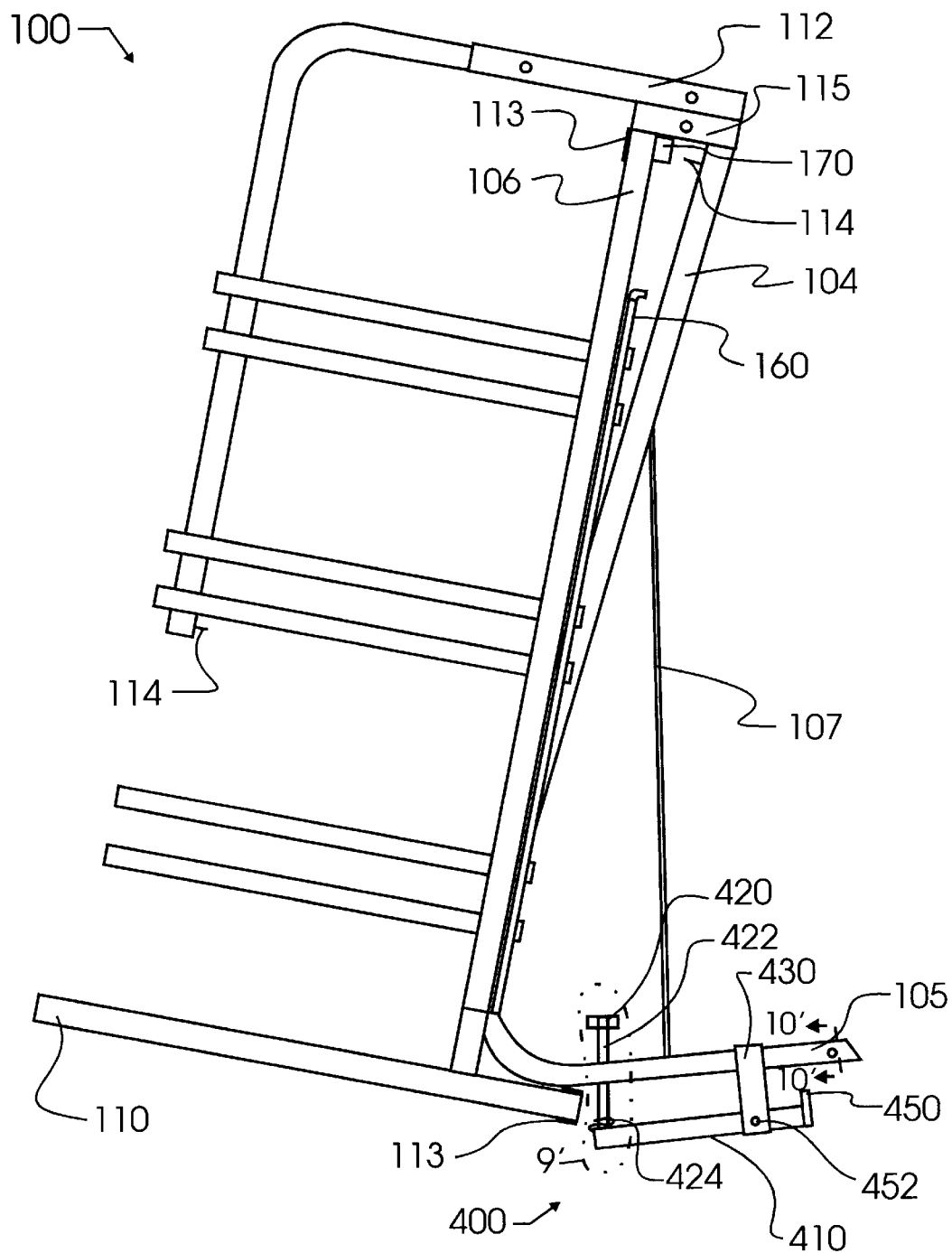
FIG. 2 illustrates the preferred embodiment of FIG. 1, from a side view.

Extending between vertical struts 102 and 106 on U-shaped tube 101 is horizontal strut 108. Horizontal strut 108 also has holes 109 therein, preferably similar to holes 103. Attached at the base of vertical struts 102, 106 is rectangular base 110, which is preferably formed from a single piece of tubing by forming four bends therein. Base 110 has two three-sided channels 111 welded onto base 110 to mate with the ends of U-shaped tube 101. In addition to channels 111, another three-sided channel 113 attaches base 110 to z-strut 104. Through channels 111 and 113, base 110 can be rigidly attached to U-shaped tube 101, while still allowing removal therefrom for shipping purposes. As is known in the industry, shipping carriers place particular constraints upon the dimensions a package may take. By using channels 111 and 113, base 110 may be laid flat with tube 101 during shipping and then may be assembled thereto in a more perpendicular manner during use as shown in FIGS. 1 and 2.

Midway between vertical struts 102 and 106 is vertical z-shaped strut 104. At the top of z-strut 104, above horizontal strut 108, is receiver 115. Receiver 115 may be permanently welded to z-strut 104 if desired. On top of receiver 115 is second receiver 112 which extends much further from z-strut 104 than receiver 115. z-strut 104 will preferably be releasably attached to U-shaped tube 101 through three-sided channel 113. Once again, this allows z-strut 104 to be released from U-shaped tube 101, so that z-strut 104 may be laid flat inside a package to conform to shipping constraints. While the particular shape of strut 104 is not critical, the combination of vertical support brace 107 and the z-shape of strut 104 provide substantial strength and resistance to fatiguing, while also providing a unique and aesthetically pleasing appearance. In addition, and as is best visible in FIG. 2, vertical strut 106 is tilted slightly from vertical, approximately fifteen degrees from vertical. The slight tilt helps to support the load prior to strapping, while also moving the load closer to the hitch. Since the amount of torque generated is calculated by the weight of the load multiplied by the distance of the load from the pivot point, bringing the load closer to the receiver hitch reduces the amount of torque generated at the hitch during vehicular movement over bumps and the like. Furthermore, the slight angle helps to bring the end of base 110 distal from hitch 105 further off of the ground, to help prevent carrier 100 from dragging when a vehicle travels over a roadway with a sudden change in inclination. For the purposes of the present disclosure, this angle change is still within a range considered to be primarily vertical, which could be as great as forty-four degrees from vertical, and rods 142–158 discussed hereinbelow are still considered to be primarily horizontal.

The combination of vertical struts 102, 106, z-strut 104, horizontal strut 108, rectangular base 110 and receiver 112 form the basic frame of carrier 100, from which a number of variations of carrier configurations are possible. Several additional components are added and moved around s about this basic framework, depending upon the cargo to be carried. By virtue of the basic frame being flat and the other components being removable and relatively two dimensional, carriers in accord with the present invention may be packaged for shipping, stocking and resale in a flat, compact package.

At various locations along struts 102, 104, 106, 108, 110 eye bolts 114 are placed, to allow tie straps, bungee cords, ropes or similar retaining devices to be used to assist in retaining cargo. While eye bolts 114 are illustrated, they are not critical to the invention and other known attachment points or retaining methods may be used.

While not absolutely critical to the invention, the basic materials used in the preferred embodiment are square steel tubes. These tubes offer low cost, low weight, ready machinability and high strength, while the square geometry prevents unwanted spinning or rotation between different sections of tubing. Moreover, the flat surfaces of square tubing ensure ready placements and alignments that are not available with round tubing. For example, with round tubing, aligning holes through which a pin must pass can be vexing. When a designer elects to change materials, the attachment methods referred to throughout the specification will need to be adapted according to the characteristics of the new materials, as is known generally.

Figure 3:
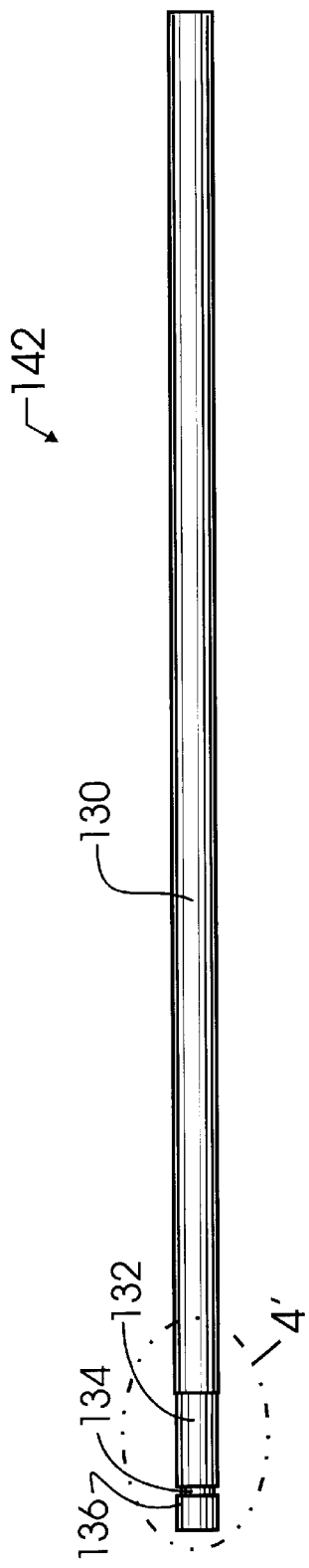
FIG. 3 illustrates a load-bearing rod from side view.
Figure 4:
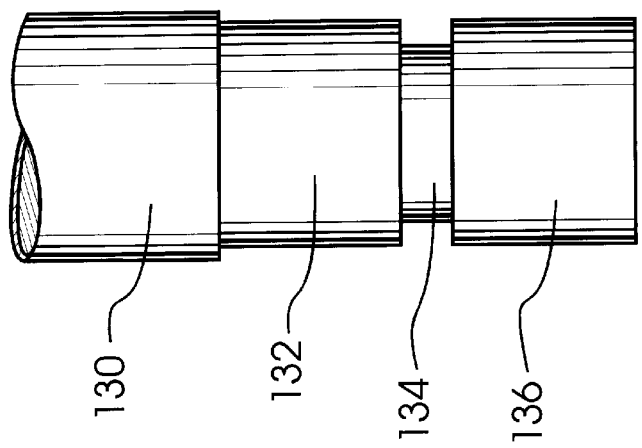
FIG. 4 illustrates the connection end of the load-bearing rod of FIG. 3 by enlarged partial view illustrated as 4' in FIG. 3.

As configured in FIG. 1, rods 142–148 and rods 152–158 are inserted through holes 103 and retained therein by sliding keyhole brackets 160. Most preferably, rods 142–148 and 152–58 have a diameter larger than holes 103, 109, except at the end which passes through the holes. This may be best seen in FIGS. 3 and 4, which illustrate rod 142 in greater detail. The increased diameter may be obtained by a number of methods, such as wrapping a majority of the rod with cushioning foam or by other coatings, such as a Plastisol brand coating. As an alternative, a rod may be machined or produced to have different diameters at opposite ends. As a further alternative, holes 103 might be drilled with one side of strut 102 having a hole larger in diameter than the other side of strut 102. In the preferred embodiment, Plastisol brand coating 130 is used to cover the majority of rods 142–158 adjacent hole 103 and extending to an end of rod 142 opposite hole 103. Rod 142 is inserted through hole 103 until the Plastisol brand coating 130 is pressed against hole 103 to retain rod 142 at a first side of hole 103. Then, sliding keyhole bracket 160 is slid downward to engage with rod 142 at necked down region 134, thereby retaining the rod at the second side of hole 103.

The core of rod 142 will preferably consist of a rod of diameter equal to sections 132 and 136, and will preferably be lathed, turned forged or otherwise formed down to a smaller diameter at necked down region 134. Subsequent to this machining, rod 142 will preferably be coated with one of the well-known anti-corrosive coatings, and then be coated with Plastisol brand coating material 130.

Figure 8:
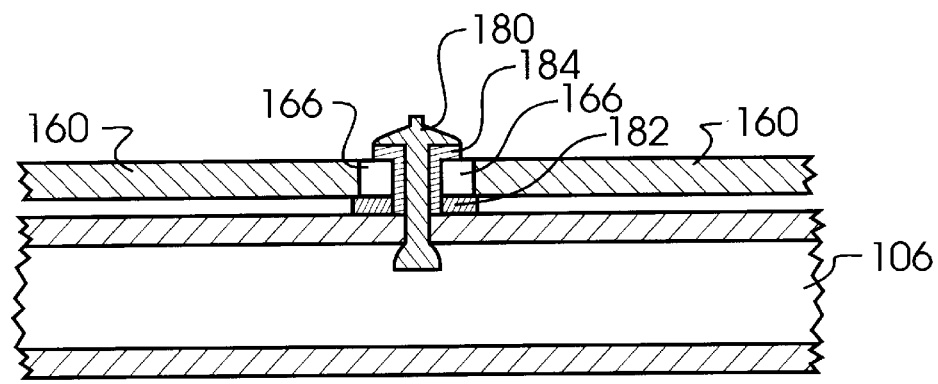
FIG. 8 illustrates the attachment of sliding locks to tubular frame pieces by cross-sectional view.

As is partially visible in FIG. 2, sliding keyhole bracket 160 is provided on the back side of both vertical strut 102 and vertical strut 106. Sliding keyhole bracket 170, shown in FIG. 7 and also partially visible in FIG. 2, is provided on the back side of horizontal strut section 108. The attachment between brackets 160, 170 and U-tube 101 is not a rigid attachment, but rather a snug, but slidable interrelationship. More specifically and as best visible in FIG. 8, brackets 160, 170 have slots 166 machined therein through which rivet 180 or other similar fasteners may be attached. Rivet 180 will stay within slot 166, but will allow bracket 160 to slide longitudinally therein. To ensure a smoother sliding motion between bracket 160 and U-tube 101, while still ensuring a solid mounting therebetween, additional anti-friction material such as nylon sleeve 184 and nylon washer 182 may be provided for around rivet 180 and between brackets 160, 170 and U-tube 101. In the preferred embodiment, only a few keyholes 163 are provided between adjacent rivet slots 166, thereby ensuring a necessary relatively consistent spacing between keyholes 163 and U-tube 101. As is best visible in FIGS. 5–7, sliding keyhole brackets 160, 170 are comprised of a number of these keyhole shaped openings 163 having a larger diameter opening 164 which is dimensioned to be approximately the same diameter as holes 103, and a slightly narrower opening 162. Opening 162 is sized to allow necked down region 134 of rod 142 to fit therein, while not allowing either portion 132 or 136 to pass therethrough. By so dimensioning keyhole openings 163, sliding keyhole brackets 160, 170 may be initially aligned with larger diameter openings 164 aligned with holes 103, 109. Rods 142–158 are then inserted through holes 103, 109 and openings 164. Finally, sliding keyhole brackets 160, 170 are slid so that narrow opening 162 slips between sections 132 and 136, surrounding section 134 and retaining section 134 against motion along the longitudinal axis of rod 142. Once sliding keyhole brackets 160, 170 are positioned to retain rods 142–158 in position, brackets 160, 170 may be locked in place by inserting a lock through holes 168, which mate with corresponding holes on U-tube 101.

Rods 142–148 do not need to be inserted into exactly corresponding holes 103 as rods 152–158 are inserted into. As shown in FIG. 1, rods 142–148 are inserted into holes 103 at the same heights as rods 152–158. However, the particular holes 103, 109 used will depend upon the particular cargo to be carried.

Additional cargo securement may be provided by attaching additional locking frames. A smaller square tube 120 is illustrated as inserted into receiver 112 in FIGS. 1 and 2. This square tube 120 serves to enclose larger cargo supported from rods 142–158, such as bicycles, thereby preventing removal therefrom. The actual length of tube 120 is not critical to the invention, and may Us$ extend partially as illustrated or may, for example, extend down to base 110. On an inner surface of tube 120, an additional eye-bolt or D-ring is shown. The use of this particular anchor point offers unique advantage in preventing any rattling of tube 120 within receiver 112 during transport. Tube 120 may alternatively be inserted into receiver 115, particularly when the load to be carried is much smaller.

Hitch 105 is shown by illustration in FIG. 2 to have an angled leading edge for insertion into a vehicle receiver. This was found to simplify installation therein, though the actual angle is not critical and in the preferred embodiment an angle of only five degrees is used. Hitch receiver lock 400, which in the preferred embodiment is integrally mounted to hitch 105, is used to prevent relative motion between a hitch receiver and carriers such as carrier I 00. A similar suitable lock is illustrated in co-pending application Ser. No. 08/920,797 the contents and teachings which are incorporated completely herein by reference. Hitch receiver lock 400 has a lever arm 410 which acts as a lever to multiply forces. Arm 410 may be solid, tubular, U-shaped or other geometry. While material is not critical, ordinary mild steel or carbon steel has been found to work satisfactorily. Extending through z-strut 104 is hand screw 420, having threads 422 and a protruding tip which engages with clip 424. At the end of arm 410 opposite hand-screw 420 is force tip 450 which is used to apply force to the vehicle receiver. Between force tip 450 and hand screw 420, but closer to force tip 450, is retention strap 430. Arm 410 is pivotally mounted to retention strap 430 at pivot 452, to allow hand screw 420 to move tip 450 closer to or further from hitch 105, and multiply the force thereof by the difference in distance from tip 450 to strap 430 and strap 430 to screw 420. In other words, if the retention strap 430 is twice as far from hand screw 420 as it is from force tip 450, then the force on active edge 452 will be twice the force on hand screw 420. By multiplying the force this way, it is relatively easy for a person to very securely clamp down and lock hitch 105 to a standard receiver.

To accommodate larger receivers, arm 410 is preferably removable from strap 430 at pivot 452. This is preferably accomplished by providing a bolt or other similar fastener at pivot 452 which may be removed. Arm 410 may then be reinstalled upside-down from the view shown in FIG. 2, so that tip 450 does not protrude towards hitch 105 at all beyond arm 410. That way, a larger receiver can be accommodated. In addition, a bushing will preferably be bolted onto hitch 105 which is of larger size to more tightly fit within, for example, a two -inch receiver. In order to allow this simple reversal while still allowing hand screw 420 to both raise and lower arm 410, clip 424 is provided and illustrated in much greater detail in FIG. 9. Where clip 424 engages with hand screw 420, hand screw 420 will preferably have a groove of slightly reduced diameter. Clip 424 will be slotted and open to the end, and so may be slid about screw 420 at the location of the groove. In addition, clip 424 has several undulations which allow it to drive arm 410 upwards and downwards, while only being slid over one end and into arm 410, so as to be easily removable therefrom.

As an added benefit, lock 400 serves to act as a skid-plate, so that if carrier 100 should inadvertently come in contact with a road surface or obstacle, the lowest point is arm 410. Since arm 410 is a low-cost and readily replaceable component, the damage to carrier 100 will be minimal and easily repairable. In addition, receiver lock 400 serves to reinforce hitch 105, thereby adding strength in an important region of carrier 100.

Figures 9, 10:
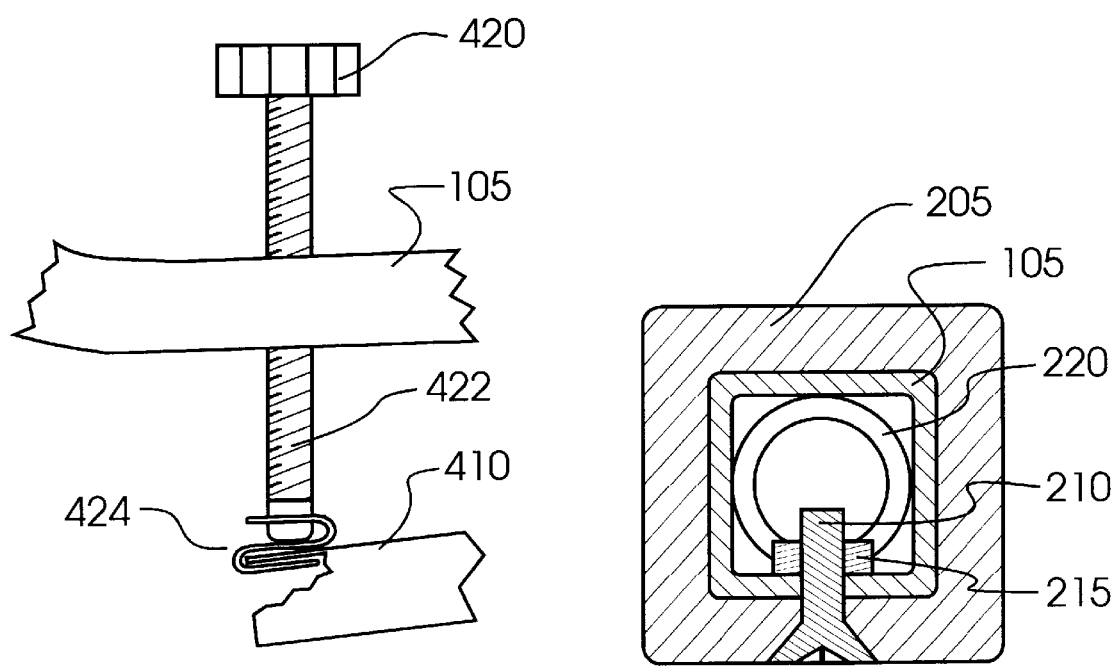
FIG. 9 illustrates the hitch receiver locking device by magnified sectional view taken from FIG. 2.
FIG. 10 illustrates a converter which may be used to convert the hitch of the preferred embodiment to fit into over-sized receivers.

FIG. 10 illustrates hitch 105 by cross-section taken along line 10' in FIG. 2, with the addition of a receiver size converter. Visible therein is hitch 105 and core stiffener 220. Core stiffener 220 extends form adjacent the receiver end of hitch 105 to immediately adjacent hand screw 420. Stiffener 220 in the preferred embodiment may also be threaded or have a nut welded thereto through which hand screw 420 turns. The greatest forces on carrier 100 are generally found in the vicinity of hitch 105, so the additional strength provided by stiffener 220 is generally desirable. Certainly other tube sizes could be used for z-strut 104, but in the preferred embodiment stiffener 220 provides the necessary strength while not increasing the weight of carrier 100 any more than necessary.

By using a round tube for stiffener 220, a problem of interference between weld seams in the stock materials is addressed. So long as the weld seam that might be found on the inside of hitch 105 does not line up with the contact between hitch 105 and the outer diameter of stiffener 220, the weld seam will not interfere. Furthermore, if the weld seam does interfere, a common drill bit or reamer can be used to open up space for stiffener 220 in an easy operation, where with square tubing the process of opening up the space would be much more complicated. Where a nut is welded to stiffener 220 for threading with screw 420, the nut should be aligned with the inside top of hitch 105 at the time of assembly, so that forces against the nut press the nut securely against hitch 105.

Around hitch 105 is a size enlarging sleeve 205, which is most preferably removably bolted to receiver 105 by flat head screw 210 and retained in place by nut 215. Should screw 210 rust to nut 215 and become unremovable therefrom, only screw 210 and nut 215 will need to be replaced, where if either receiver 105 or enlarging sleeve 205 were threaded, replacement of rusted components would be more difficult and expensive. Sleeve 205 may only extend for a few inches longitudinally along hitch 105, sufficient to properly fill available space within the larger receiver while still adding only minimal weight to carrier 100.

As will be readily understood from the easy hitch removal and self-supporting nature of carrier 100, rather than having to separately remove all of the cargo, the entire carrier 100 may be used as a storage center, and be ready to transport for the next outing. This is a distinct advantage in the marketplace, since carriers typically detract from the aesthetic appearance of the vehicle and are desirably removed when not in use. Most prior art carriers are not free standing and must be disassembled at least partially during removal or after removal for storage. The cargo must be removed. To prepare for the next outing the entire process must be reversed. Carriers designed in accord with the present invention are simply slid off of the receiver hitch and stored, ready for re-use another time without any further disassembly or unpacking. Particularly for those persons seeking leisure, this is a distinct advantage.

While the foregoing details what are felt to be the preferred embodiments of the invention, no material limitations to the scope of the claimed invention are intended. Further, features and design alternatives that would be obvious to one of ordinary skill in the art are considered to be incorporated herein. Specific materials, different arrangements of basic components illustrated herein, special coatings and other such deviations are taught by the present disclosure and deemed included herewith, even where not specifically recited. Known variations would be readily applied, by those of ordinary skill, to the present invention. The scope of the invention is set forth and particularly described in the claims hereinbelow.

I claim:

1. A cargo carrier for a vehicle comprising:
   a first support having a first hole transverse to said first support;
   a means for locking said carrier to said vehicle during cargo transport;
   a first rod extending through said first hole and extending transverse to said first support for suspending said cargo, said first rod having a first end enlarged relative to and adjacent a narrower region and a section enlarged and adjacent said narrower region but located longitudinally opposite said first end relative to said narrower region;
   a first sliding keyhole lock having a first keyhole opening therein, said first keyhole opening having a first larger diameter opening through which said first end of said rod will pass and a smaller slot opening extending from said first larger diameter opening through which said first end of said first rod will not pass but through which said adjacent narrower region of said first rod will pass;
   said first rod engaged by said first sliding keyhole lock at said adjacent narrower region, whereby said first rod is restrained extending through said first hole by said sliding keyhole lock.

2. The cargo carrier of claim 1 further comprising a second hole transverse to said first support, said second hole displaced on said first support relative to said first hole;
   whereby said first rod can be removed from extending through said first hole to extend through said second hole.

3. The cargo carrier of claim 2 wherein said locking means comprising a tongue insertable into a hitch receiver, wherein said first support extends vertically with respect to said tongue.

4. The cargo carrier of claim 3 wherein said second hole is vertically displaced from said first hole.

5. The cargo carrier of claim 4 further comprising:
   a second vertical support having a third hole transverse to said second vertical support and a fourth hole transverse to said second vertical support, said fourth hole vertically displaced on said second vertical support relative to said third hole;
   a second rod extending through said third hole and extending transverse to said second vertical support for directly engaging cargo, said second rod having a first end enlarged relative to and adjacent a narrower region and a section enlarged and adjacent said narrower region but located longitudinally opposite said first end relative to said narrower region;
   a second sliding keyhole lock having a first keyhole opening therein, said keyhole opening having a first larger diameter opening through which said first end of said second rod will pass and a smaller slot opening extending from said first larger diameter opening of said second keyhole opening through which said first end of said second rod will not pass but through which said adjacent narrower region of said second rod will pass;
   said second rod engaged by said second sliding keyhole lock at said adjacent narrower region of said second sliding keyhole lock, whereby said second rod is retained extending through one of said third and fourth holes by said second sliding keyhole lock.

6. The cargo carrier of claim 5 further comprising:

a third spacing support horizontally spacing said first vertical support from said second vertical support; and said locking means mechanically interconnected to and supporting said first and second vertical supports and said third spacing support.

7. The cargo carrier of claim 6 further comprising a first longitudinal support perpendicular to said first vertical support and located vertically at a bottom end thereof, and a second longitudinal support perpendicular to said second vertical support and located vertically at a bottom end thereof.

8. The cargo carrier of claim 7 wherein said first and second longitudinal supports extend longitudinally sufficiently to support said carrier when said carrier is placed on a horizontal surface.

9. The cargo carrier of claim 5 further comprising third and fourth rods for directly engaging cargo, each of said rods singularly passing through and retained in one of said first, second, third and fourth holes by said first and said second sliding keyhole locks.

10. An adaptable vehicularly mounted carrier for skis, ski poles, bicycles, snowboards, surf boards and canoe paddles comprising:

means for releasable locking to a vehicle, means for supporting a load coupled to said locking means and extending primarily vertically therefrom, said load supporting means releasably retained by said locking means to said vehicle;

a plurality of means for engaging said cargo, said plurality of engaging means supported on said load supporting means;

a means for restraining said plurality of engaging means to said load supporting means, having a first opening through which a respective one of said engaging means operatively passes, a second opening smaller than but adjacent to said first opening through which said one engaging means may not pass, said restraining means adjustable to align either said first or said second opening with said one engaging means;

said plurality of engaging means releasably attachable to said supporting means at a plurality of both horizontally and vertically different locations of said supporting means and extending primarily horizontally therefrom to securely engage various cargo including said skis, ski poles, bicycles, snowboards, surfboards, and canoe paddles.

11. The adaptable carrier of claim 10 further comprising a rigid means for locking said cargo within said adaptable carrier which is supported by said supporting means and further is reconfigurable to an unlocked position.

12. The adaptable carrier of claim 10 further comprising a means for standing said supporting means, releasably and rigidly coupled to said supporting means while said supporting means is retained to said vehicle, upon which said supporting means may stand in said vertical direction from said vehicle locking means when said vehicle locking means is not locked to said vehicle.

13. The adaptable carrier of claim 10 wherein said restraining means changes from aligning either said first or said one second opening with said engaging means by relative motion transverse to said one engaging means.

14. The adaptable carrier of claim 10 wherein each engaging means of said plurality of engaging means is comprised by a like rod, each like rod insertable through a respective hole within said supporting means.

15. The adaptable carrier of claim 10 wherein said supporting means comprises two vertical struts spaced from each other.

16. The adaptable carrier of claim 15 wherein said vertical struts have a plurality of holes therein, into which said plurality of engaging means are respectively insertable.

17. The adaptable carrier of claim 15 wherein said supporting means comprises a transverse spacer means between said two vertical struts, said transverse spacer means having said plurality of horizontally different locations.

18. The adaptable carrier of claim 15 wherein said supporting means comprises a transverse strut having a plurality of holes therein into which said plurality of engaging means are respectively insertable.

19. A trailer hitch carrier adapted to be attached to a motor vehicle trailer hitch receiver and supported thereon, comprising:

a carrier hitch insertable within said motor vehicle trailer hitch receiver;

a first vertical strut extending vertically from said carrier hitch;

a first horizontal strut adjacent at a midpoint thereof to said first vertical strut but perpendicular thereto and transverse to said carrier hitch, said first horizontal strut having a plurality of holes therethrough and a first end and second end opposite each other from said midpoint;

a second vertical strut adjacent said first end of said first horizontal strut but perpendicular thereto, said second vertical strut having a plurality of holes therethrough;

a third vertical strut adjacent said second end of said first horizontal strut but perpendicular thereto, said third vertical strut having a plurality of holes therethrough;

a plurality of rods respectively extending from some of said plurality of holes in said second and third vertical struts for engaging with cargo and repeatably removable therefrom;

a first locking means adjacent to, retained with and movable relative to said second vertical strut for locking some of said plurality of rods to said second vertical strut; and a second locking means adjacent to, retained with and movable relative to said third vertical strut for locking the other of said plurality of rods to said third vertical strut.

20. The trailer hitch carrier of claim 19 wherein said first locking means comprises a sliding bar longitudinally co-extensive with said second vertical strut but longitudinally movable relative to said second vertical strut through a limited range of motion, having keyhole openings therein.

* * * * *